United States Patent
Muma et al.

(10) Patent No.: US 7,931,554 B2
(45) Date of Patent: Apr. 26, 2011

(54) ENDLESS BELT

(75) Inventors: William T. Muma, Wentzville, MO (US); William H. S. Chen, Mississauga (CA); Yu-Chun Chen, Mississauga (CA)

(73) Assignee: Tri Corp., St. Louis, MO (US)

( * ) Notice: Subject to any disclaimer, the term of this patent is extended or adjusted under 35 U.S.C. 154(b) by 439 days.

(21) Appl. No.: 11/616,184

(22) Filed: Dec. 26, 2006

(65) Prior Publication Data
US 2008/0153647 A1    Jun. 26, 2008

(51) Int. Cl.
F16G 1/00 (2006.01)
B29D 17/00 (2006.01)

(52) U.S. Cl. ........ 474/237; 474/247; 474/260; 474/261; 474/262; 474/263; 156/137

(58) Field of Classification Search .................. 474/237, 474/247, 260, 261, 262, 263; 156/137
See application file for complete search history.

(56) References Cited

U.S. PATENT DOCUMENTS

| | | | |
|---|---|---|---|
| 1,412,309 A | 4/1922 | Lambert | |
| 2,113,561 A | 4/1938 | Freedlander | |
| 2,582,366 A | 1/1952 | White | |
| 2,630,603 A * | 3/1953 | Freedlander et. al. | 19/153 |
| 3,047,446 A * | 7/1962 | Henson | 428/222 |
| 3,076,736 A | 2/1963 | McHugh | |
| 3,101,290 A | 8/1963 | Paul | |
| 3,144,930 A | 8/1964 | Michels | |
| 3,395,529 A * | 8/1968 | Ray | 57/237 |
| RE26,731 E | 12/1969 | Robinson | |
| 3,485,707 A | 12/1969 | Spicer | |
| 3,582,154 A | 6/1971 | Russ, Sr. | |
| 3,820,409 A | 6/1974 | Meadows | |
| 3,911,755 A | 10/1975 | Vance, Sr. | |
| 3,941,005 A | 3/1976 | Gardiner, III et al. | |
| 3,944,060 A | 3/1976 | Hartmann | |
| 3,949,799 A * | 4/1976 | Montagne | 152/527 |

(Continued)

FOREIGN PATENT DOCUMENTS

JP    63222847    9/1988

(Continued)

OTHER PUBLICATIONS

PCT/US07/087847 PCT International Search Report dated Jun. 25, 2008, 3 pages, United States.

*Primary Examiner* — Bradley T King
*Assistant Examiner* — Mahbubur Rashid
(74) *Attorney, Agent, or Firm* — Senniger Powers LLP

(57) ABSTRACT

A flexible endless belt includes cords extending generally lengthwise of the belt in multiple turns. An Outer end of each cord may be located in a position that is not substantially laterally outward of other portion of the laterally outermost turn of the cord so as to prevent fraying of the cord at the outer end. When the belt is received on roller in a baler, the outer ends of the cords lead at least a part of respective transition portions. A carcass for the belt may have a first cord wound in a Z-direction along the length of the belt and comprising at least two threads wound in the Z-direction and a second cord wound in an S-direction along the length of the belt and comprising at least two threads wound in the S-direction.

15 Claims, 8 Drawing Sheets

U.S. PATENT DOCUMENTS

| | | | |
|---|---|---|---|
| 3,996,813 | A | 12/1976 | Henderson et al. |
| 4,004,467 | A | 1/1977 | Kenney |
| 4,094,402 | A | 6/1978 | Heeke |
| 4,224,370 | A | 9/1980 | Heinemann |
| 4,279,676 | A | 7/1981 | Morrison et al. |
| 4,371,580 | A | 2/1983 | Morrison et al. |
| 4,555,241 | A | 11/1985 | Takano et al. |
| 4,650,068 | A | 3/1987 | Vanassche et al. |
| 4,721,498 | A * | 1/1988 | Grob ............................ 474/261 |
| 4,937,925 | A | 7/1990 | McGee, Jr. |
| 5,211,609 | A | 5/1993 | Haines |
| 5,244,436 | A | 9/1993 | Kurokawa |
| 5,298,956 | A | 3/1994 | Mammino et al. |
| 5,409,557 | A | 4/1995 | Mammino et al. |
| 5,516,391 | A * | 5/1996 | Schanin et al. ............... 156/137 |
| 5,519,990 | A * | 5/1996 | Rodewald et al. .............. 56/341 |
| 5,521,007 | A | 5/1996 | Kurokawa |
| 5,573,619 | A | 11/1996 | Benedict et al. |
| 5,575,729 | A | 11/1996 | Feldmann et al. |
| 5,578,096 | A | 11/1996 | Christianson et al. |
| 5,599,604 | A | 2/1997 | Goettsch et al. |
| 5,609,706 | A | 3/1997 | Benedict et al. |
| 5,632,701 | A | 5/1997 | Neel |
| 5,705,446 | A | 1/1998 | Fujishiro et al. |
| 5,830,248 | A | 11/1998 | Christianson et al. |
| 6,235,133 | B1 | 5/2001 | Sato |
| 6,406,577 | B1 | 6/2002 | Benedict et al. |
| 6,632,151 | B1 | 10/2003 | Knutson |
| 6,739,996 | B2 * | 5/2004 | Ueno et al. .................... 474/246 |
| 6,827,660 | B2 | 12/2004 | Love et al. |
| 6,945,892 | B2 | 9/2005 | Knutson |
| 2003/0017900 | A1 | 1/2003 | Kopang |
| 2003/0073533 | A1 | 4/2003 | Knutson |
| 2003/0078125 | A1 | 4/2003 | Knutson |
| 2004/0048709 | A1 | 3/2004 | Knutson |

FOREIGN PATENT DOCUMENTS

| | | | |
|---|---|---|---|
| JP | 4000039 | | 1/1992 |
| JP | 04118307 | A * | 4/1992 |
| JP | 6107311 | | 4/1994 |
| JP | 8067318 | | 3/1996 |
| JP | 9100043 | | 4/1997 |
| WO | WO0017074 | A1 | 3/2000 |

* cited by examiner

ENDLESS BELT

FIELD OF THE INVENTION

The present invention generally relates to an endless elastomeric belt.

BACKGROUND OF THE INVENTION

Endless elastomeric belts are used in hay balers, more specifically round hay balers, to compress and roll hay into compact cylindrical bundles. The belt is considered "endless" because it is formed as a continuous loop without a transverse joint. Typically, several of these belts are received around a series of rollers inside the hay baler. The belts are driven along the rollers so that hay introduced into the baler is compressed and rolled by the belts. It is noted that both surfaces of the belts contact the rollers.

Because each belt is formed as continuous loop, conventional belts are typically spliced. Various ways of splicing a belt have been utilized. For example, the belt may be spliced by using a "clipper lace" splice. A clipper lace splice uses a plurality of metal eyelets disposed one opposite ends of the belt and a rod is passed through the eyelets to secure the ends of the belt together and configure the belt into a continuous loop. The clipper lace splice has been shown to fail after a relatively small number of uses because contact between the eyelets and the roller in the bay haler cause the eyelets to thin and the splice eventually breaks. In another example, the belt may be spliced by using a "step" splice. This splice is formed by progressively cutting back plies along the length of the belt at each end of the belt so as to form steps at the ends. The ends are then mated together and held together by adhesive. A belt with a "step" splice has a larger thickness at the splice and usually has a relatively short flex life. The splice typically fails because the plies are cut and secured by adhesive.

The above-mentioned problems associated with splicing the belts have been alleviated by forming belts as a continuous loop with no splice. However, conventional "spliceless" belts tend to fail because wear around edges of the belt can expose cords of the belt. The location of an end of the cord is such that the cord end can easily be caught by the machining (e.g., a pulley). This can result in rapid failure of the belt.

SUMMARY OF THE INVENTION

In one aspect of the present invention, a flexible endless belt having a length defining a direction of travel in use generally comprises a body extending in an endless loop around the length of the belt. The body has a centerline and opposite longitudinal edges. A cord is located generally within the body and extends generally lengthwise of the belt in multiple turns around the body. The cord includes an inner end and an outer end. The inner end is located nearer to the centerline of the body than the outer end. The outer end is located nearer to one of the opposite longitudinal edges of the body. The cord includes a laterally outermost turn. The laterally outermost turn contains the outer end and is located nearest the one longitudinal edge of the body. The outer end of the cord is located in a position which is not substantially laterally outward of other portions of the laterally outermost turn of the cord.

In another aspect, a baler generally comprises a series of rollers driven about generally parallel rotational axes. An endless elastomeric belt is received around the rollers so that the rollers drive the belt in a direction of travel. The elastomeric belt comprises a carcass including an elastomeric matrix having opposite edges defining a width of the matrix and first and second cords embedded in the matrix. The first and second cords are wound generally along the direction of travel. Each cord has a first end generally adjacent to a center of the width of the matrix and a second end generally adjacent to one of the edges of the matrix. Each cord has a laterally outermost turn including the outer end. The laterally outermost turn of each cord extends generally in the direction of the travel of the belt at a primary portion and extends at an angle with respect to the direction of travel at a transition portion. Each of the first ends of the cords leads at least a part of the transition portion of the respective laterally outermost turn with respect to one of the rollers as the belt is driven on the rollers.

In yet another aspect, a carcass for an endless elastomeric belt generally comprises a body extending in an endless loop around the length of the belt. The body has a centerline and opposite longitudinal edges. A first cord generally within the body is wound in a Z-direction along the length of the belt. The first cord has an inner end generally adjacent to the centerline of the body and an outer end generally adjacent to one of the opposite longitudinal edges of the body. The first cord comprises at least two threads wound in the Z-direction. A second cord generally within the body is wound in an S-direction along the length of the belt. The second cord has an inner end generally adjacent to the centerline of the body and an outer end generally adjacent to one of the opposite longitudinal edges of the body remote from the outer end of the first cord. The second cord comprises at least two threads wound in the S-direction.

Other features will be in part apparent and in part pointed out hereinafter.

BRIEF DESCRIPTION OF THE DRAWINGS

Corresponding reference characters indicate corresponding parts throughout the drawings.

DETAILED DESCRIPTION OF THE DRAWINGS

Figure 1:
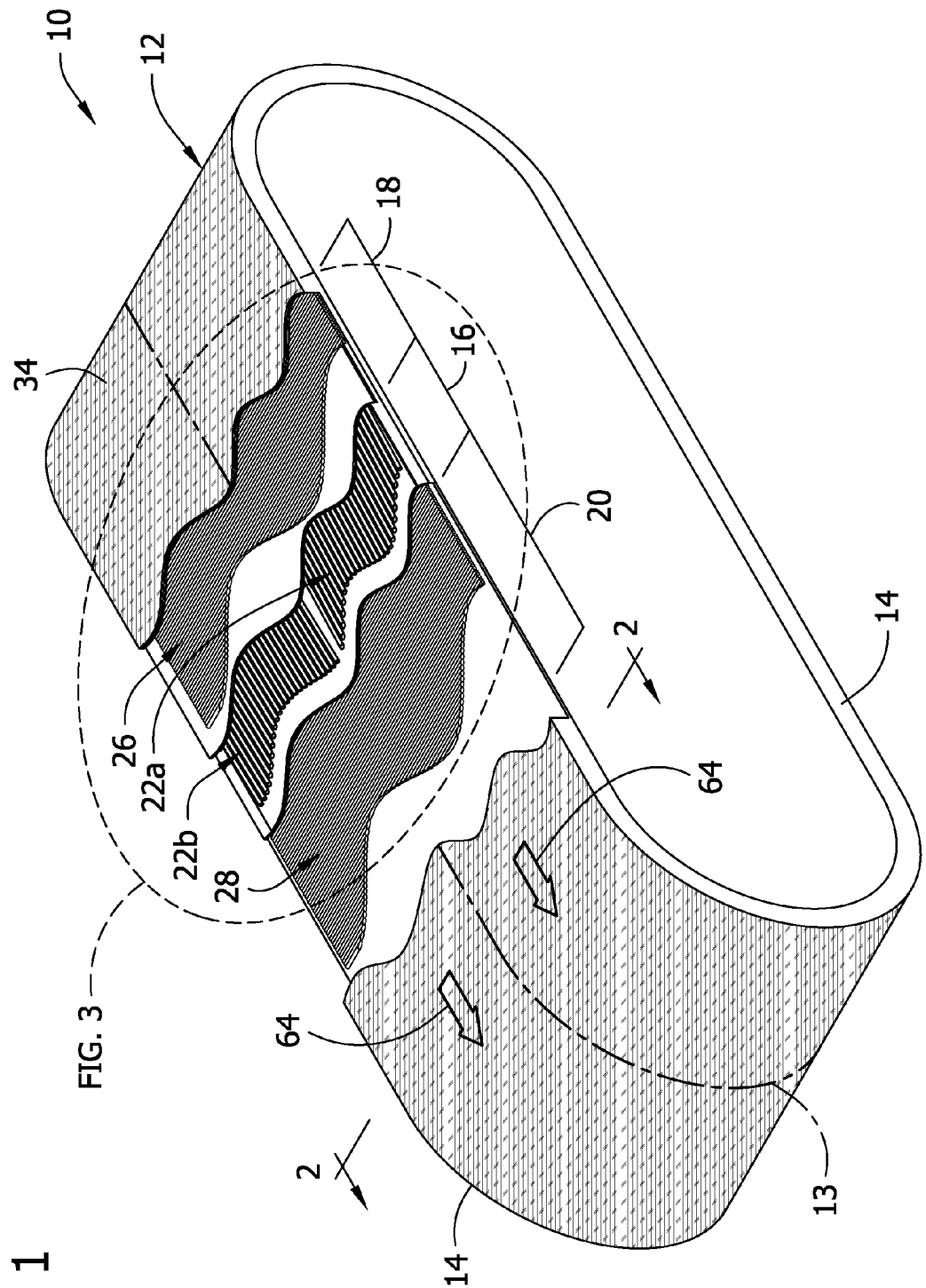
FIG. 1 is a perspective of one embodiment of an endless elastomeric belt with parts broken away to show internal construction.
Figure 2:
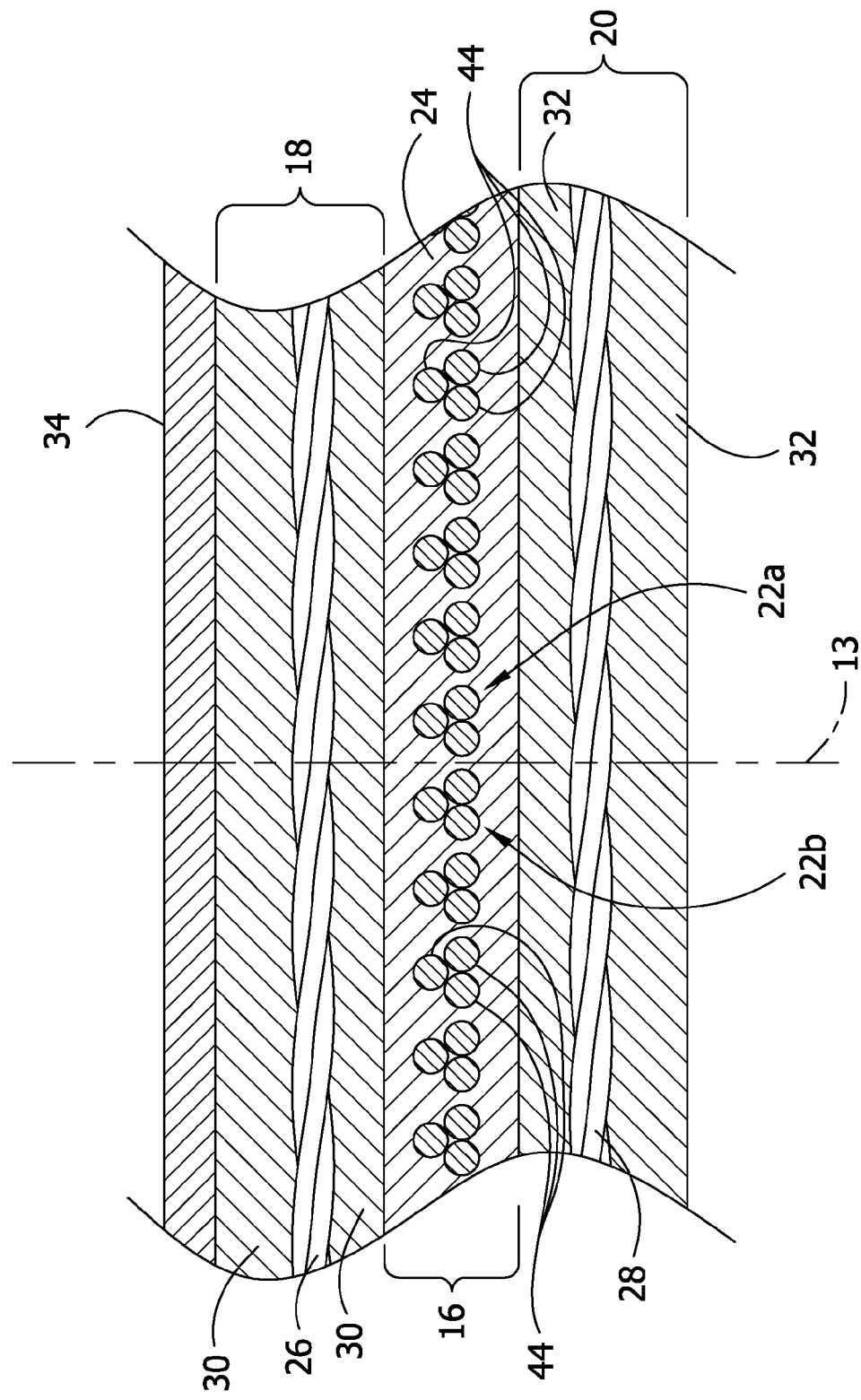
FIG. 2 is a fragmentary cross-section of the belt taken in the plane containing the line 2-2 of FIG. 1.
Figure 3:
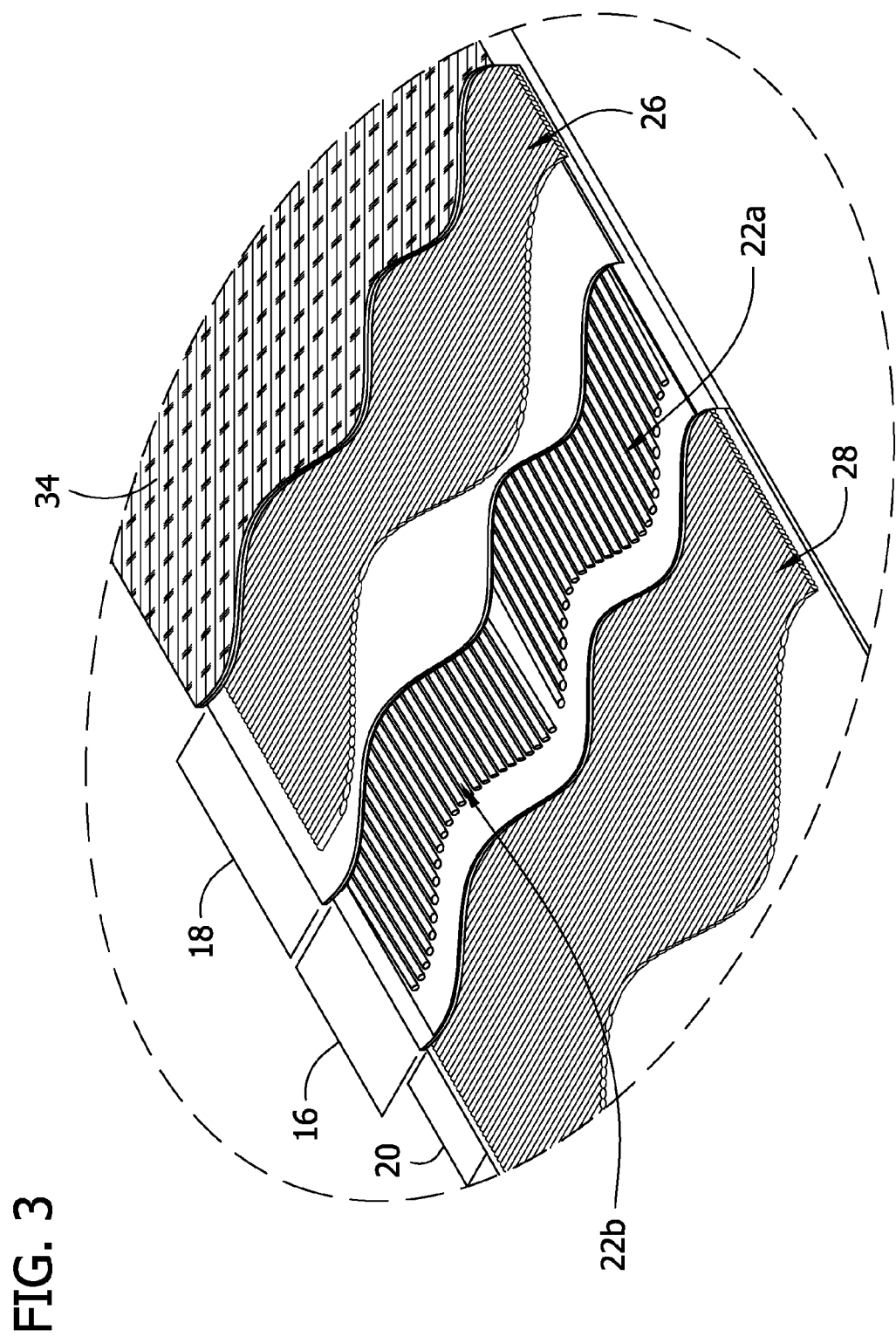
FIG. 3 is an enlarged fragmentary view of the belt in FIG. 1.
Figure 4:
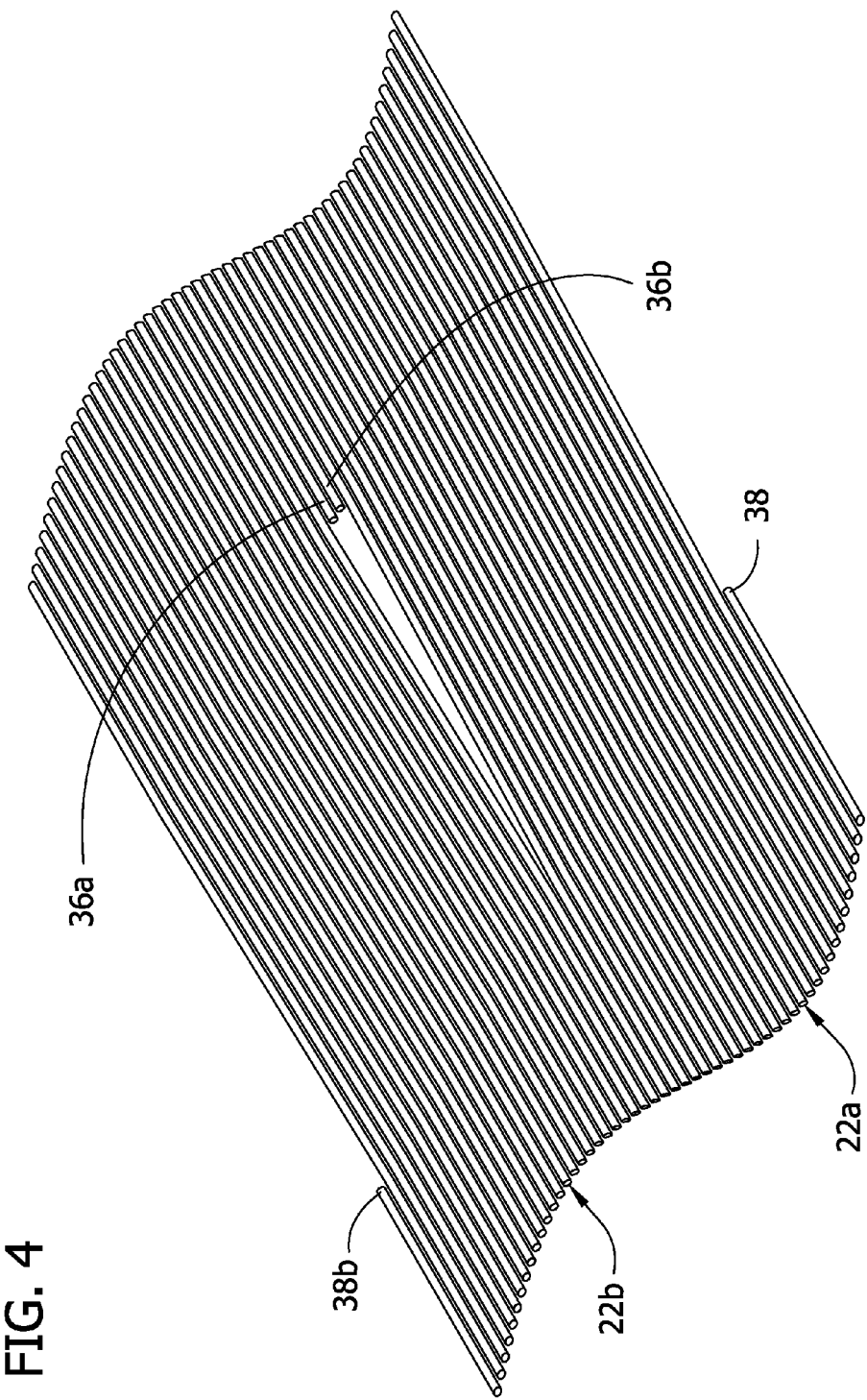
FIG. 4 is a fragmentary perspective of first and second carcass cords of the belt.

Referring now to the drawings, and in particular to FIGS. 1-3, one embodiment of a flexible, endless elastomeric baler belt constructed according to the principles of the present invention is generally indicated at 10. A body 12 of the belt 10 extends in an endless loop around a length of the belt. The body 12 has a centerline 13 along its length and opposite longitudinal edges 14. As shown best in FIG. 2, the belt 12 generally comprises a carcass 16 sandwiched between upper and lower transverse layers 18, 20, respectively. As explained in more detail below, the carcass 16 includes first and second carcass cords, generally indicated at 22a, 22b, respectively, embedded in an elastomeric matrix 24. The transverse layers 18, 20 include a plurality of respective upper and lower transverse cords 26, 28, respectively, each embedded in respective elastomeric matrices 30, 32, respectively. An upper surface 34 of the belt 10 has an embossed pattern for gripping hay as it is being bailed. It is to be understood that the belt 10 may have differences in construction from what is described herein without departing from the scope of the present invention.

Figure 5:
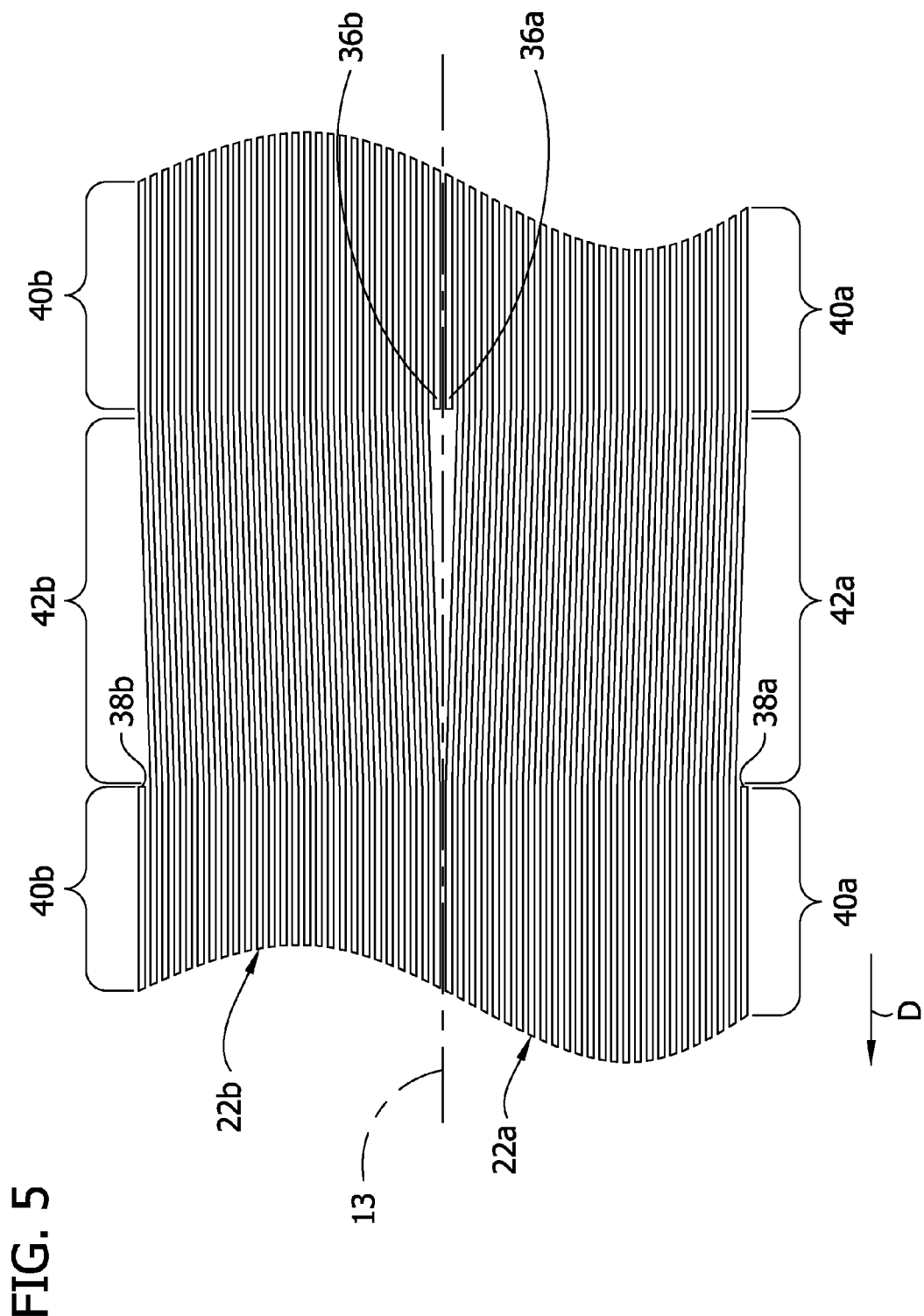
FIG. 5 is a top plan of the cords of FIG. 4.

Referring to FIGS. 1 and 3-5, the first and second carcass cords 22a, 22b are helically wound around the circumference of the belt 10 in multiple turns. As referred to herein, the term "turn" refers to a single complete (360°) turn of the respective cord around the length of the belt 10. The carcass cords 22a, 22b are wound so that inner ends 36a, 36b, respectively, of the cords are generally adjacent to the centerline 13 of the body 12 and outer ends 38a, 38b of the cords are generally adjacent to the respective longitudinal edges 14 of the body (see, FIG. 5). Referring specifically to FIG. 5, the multiple turns of the carcass cords 22a, 22b define first sections 40a, 40b, respectively, in which the cords extend substantially parallel to the centerline 13 of the body 12 and second sections 42a, 42b in which the cords extend at an angle to the centerline.

As will be understood by those of ordinary skill in the art, the carcass cords 22a, 22b are wound in different directions along the length of the belt 10. In the illustrated embodiment, the first cord 22a is wound in the Z-direction around the length of the belt 10, while the second cord 22b is wound in the S-direction around the length of the belt. It is understood that the cords 22a, 22b may be wound in directions other than shown in the drawings. For example, the first cord 22a may be wound in the S-direction, while the second cord 22b is wound in the Z-direction or each of the cords may be wound in the same direction (i.e., either the Z-direction or the S-direction).

Referring back to FIG. 2, each of the carcass cords 22a, 22b preferably comprises between about three and nine adhesive dipped polyester threads 44. Each of the threads comprises a plurality of yarns, such as between about 3 and about 9 adhesive dipped polyester yarns. It is understood that the cords 22a, 22b may comprise other types of threads besides or in addition to adhesive dipped polyester threads. As will be understood by those of ordinary skill in the art, the threads 44 of each cord 22a, 22b are spiraled either clockwise or counterclockwise to form the cord, making each cord either a Z-cord or an S-cord, respectively. Broadly, the carcass cords 22a, 22b are preferably wound in the same direction around the length of the belt 10 as the direction of the threads that constitute the cords. In other words, if a carcass cord is wound in the Z-direction around the length of the belt 10, then that carcass cord is preferably a Z-cord, and vice versa. Accordingly, in the illustrated embodiment the first carcass cord 22a is preferably a Z-cord because the first cord is wound in the Z-direction around the length of the belt 10, while the second cord 22b is preferably an S-cord because the second cord is wound in the S-direction around the length of the belt. Other configurations and arrangements of the cords 22a, 22b are within the scope of the invention.

Figure 6:
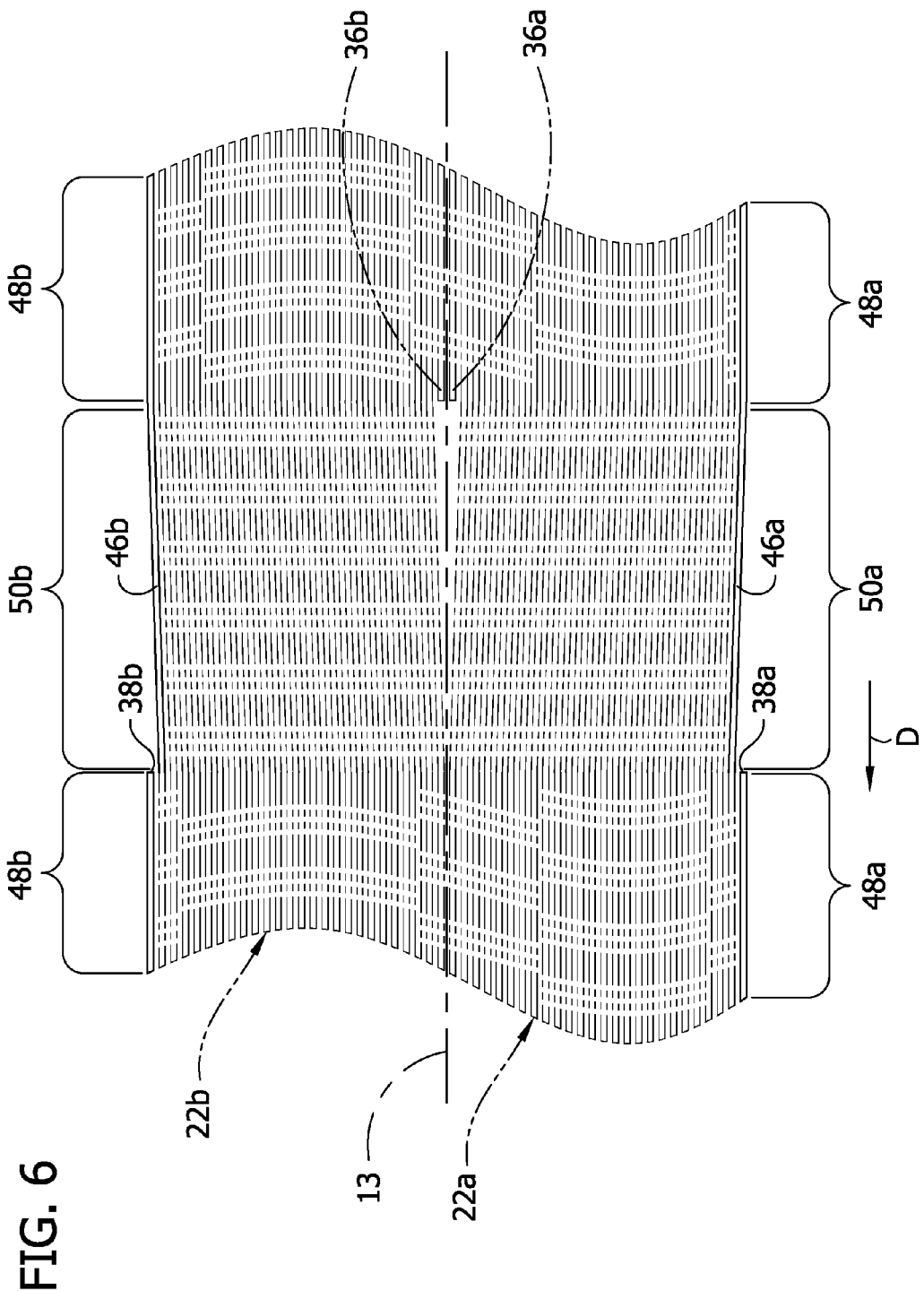
FIG. 6 is similar to FIG. 5 with the carcass cords being shown in phantom lines except for laterally outermost turns of the cords.

Referring to FIG. 6, laterally outermost turns 46a, 46b, respectively, of the carcass cords 22a, 22b, located nearest to respective longitudinal edges 14 of the body 12, contain the outer ends 38a, 38b of the cords. The laterally outermost turn 46a, 46b of each cord 22a, 22b includes a first portion 48a, 48b, respectively, in which the turn extends substantially parallel to the centerline 13 of the body 12, and a second portion 50a, 50b, in which the turn extends at an angle to the centerline. The outer end 38a, 38b of each carcass cord 22a, 22b is located in a position that is not laterally outward of the other portions of the laterally outermost turn 46a, 46b of the cord. More specifically, the outer end 38a, 38b of each cord 22a, 22b is part of the first portion 48a, 48b of the laterally outermost turn 46a, 46b so that the outer end is substantially aligned with a longitudinally opposing part of the laterally outermost turn. As explained in more detail below, in this way the outer end 38a, 38b of each cord 22a, 22b is effectively protected by the opposing part of the respective laterally outermost turn 46a, 46b.

Referring to FIGS. 1 and 2, the transverse cords 26, 28 of the upper and lower transverse layers 18, 20, respectively, are laid out side-by-side around the length of the belt 10 and extend transverse to the centerline 13 of the body 12. The upper and lower transverse cords 18, 20, respectively, may comprise tire cord #2200, or other cords composed of other material. The upper and lower elastomeric transverse matrices 28, 30, respectively, may be similar or identical to the carcass matrix 24.

Figure 7:
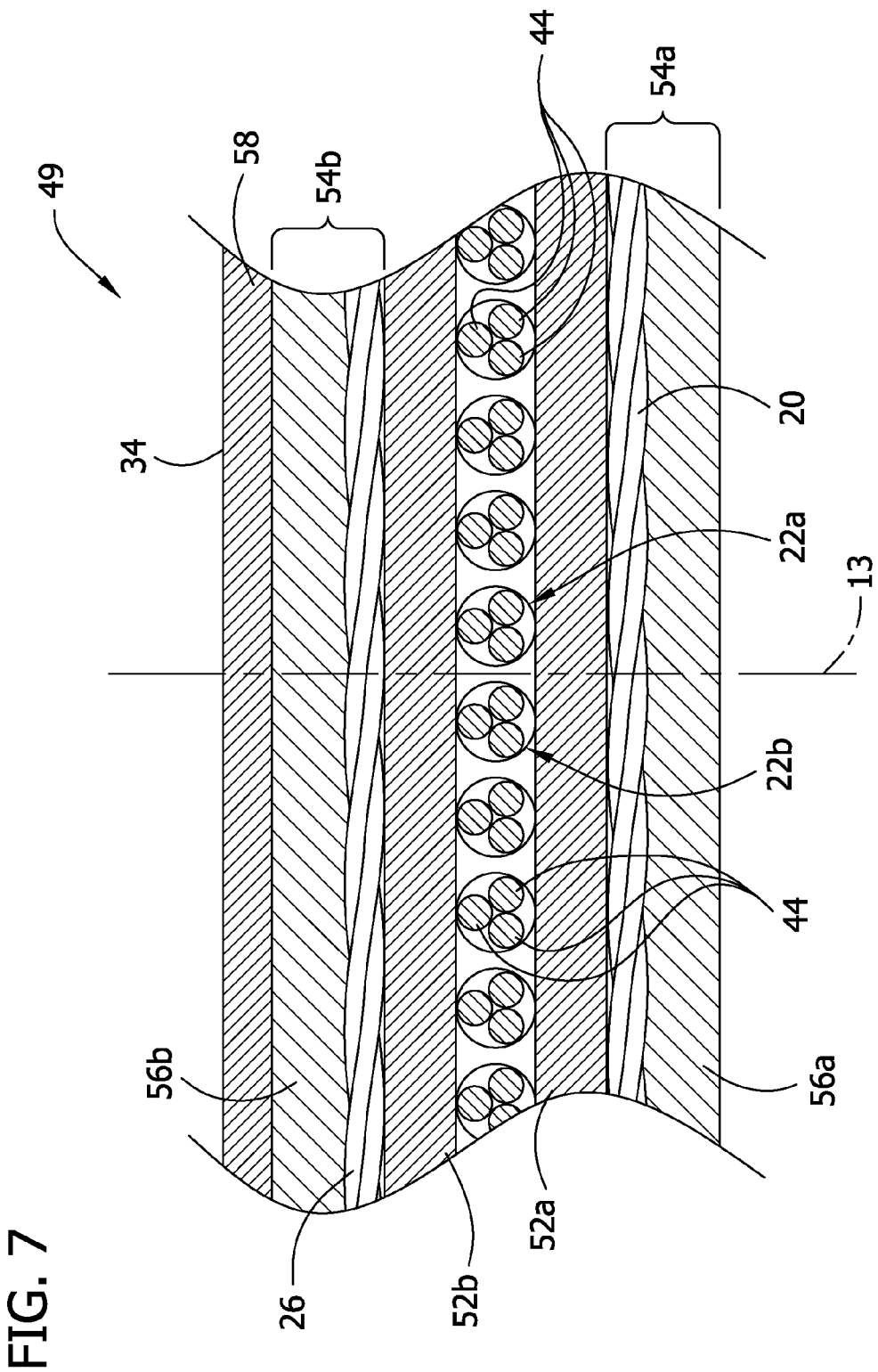
FIG. 7 is a fragmentary section of a subassembly of the belt.

Referring to FIG. 7, in one example of a method of making the belt 10, a belt subassembly, generally indicated at 49, is formed. The first and second carcass cords 22a, 22b are wound to the desired length of the belt 10 so that the relative locations of the inner and outer ends 36a, 36b and 38a, 38b of the cords are as described above. A lower elastomeric carcass layer 52a is then applied to a lower face of the cords 22a, 22b, and an upper elastomeric carcass layer 52b is applied to an upper face of the cords. The elastomeric layers 52a, 52b comprise calendered rubber, which may be fiber loaded. An upper transverse layer subassembly 54b is then applied to the upper carcass layer 52b. The upper transverse layer subassembly 54b includes a sheet of calendered rubber 56b and the side-by-side transverse upper cords 26 on one surface of the sheet. The upper transverse layer subassembly 54b is applied to the upper carcass layer 52a so that the transverse cords 26 are disposed between the sheet of calendered rubber 56b and the upper carcass layer. Likewise, a lower transverse layer subassembly 54a is applied to the lower carcass layer 52a. Like the upper transverse layer subassembly 54b, the lower transverse layer subassembly 54a includes a sheet of calendered rubber 56a and the side-by-side transverse cords 20 on one surface of the sheet. The lower transverse layer subassembly 54a is applied to the lower carcass layer 52a so that the transverse cords 28 are disposed between the sheet of calendered rubber 56a and the lower rubber carcass layer. Finally, a top layer 58 of calendered rubber having the upper embossed surface 34 is applied to the upper transverse layer subassembly 52b.

The belt subassembly 49 is cured so that the respective layers 52a, 52b, 56a, 56b, 58 and cords 22a, 22b, 26, 28 are formed into the integral belt 10, and the respective cords being embedded in the corresponding matrices 24, 30, 32, as described above and shown in FIGS. 1-6. The upper and lower carcass layers 52a, 52b form the carcass matrix 16. The upper carcass layer 52a and the upper transverse layer 56b form the upper transverse matrix 30, while the lower carcass layer 52b and the lower transverse layer 56a form the lower transverse matrix 32. Other ways of assembling the belt to form the appropriate matrices are within the scope of the invention. In one example, the belt 10 may be cured in an endless belt vulcanizing press, as is generally known in the art. Other ways of curing the belt 10 are within the scope of the invention. Moreover, the belt 10 may be assembled in other ways without departing from the scope of the invention.

Figure 8:
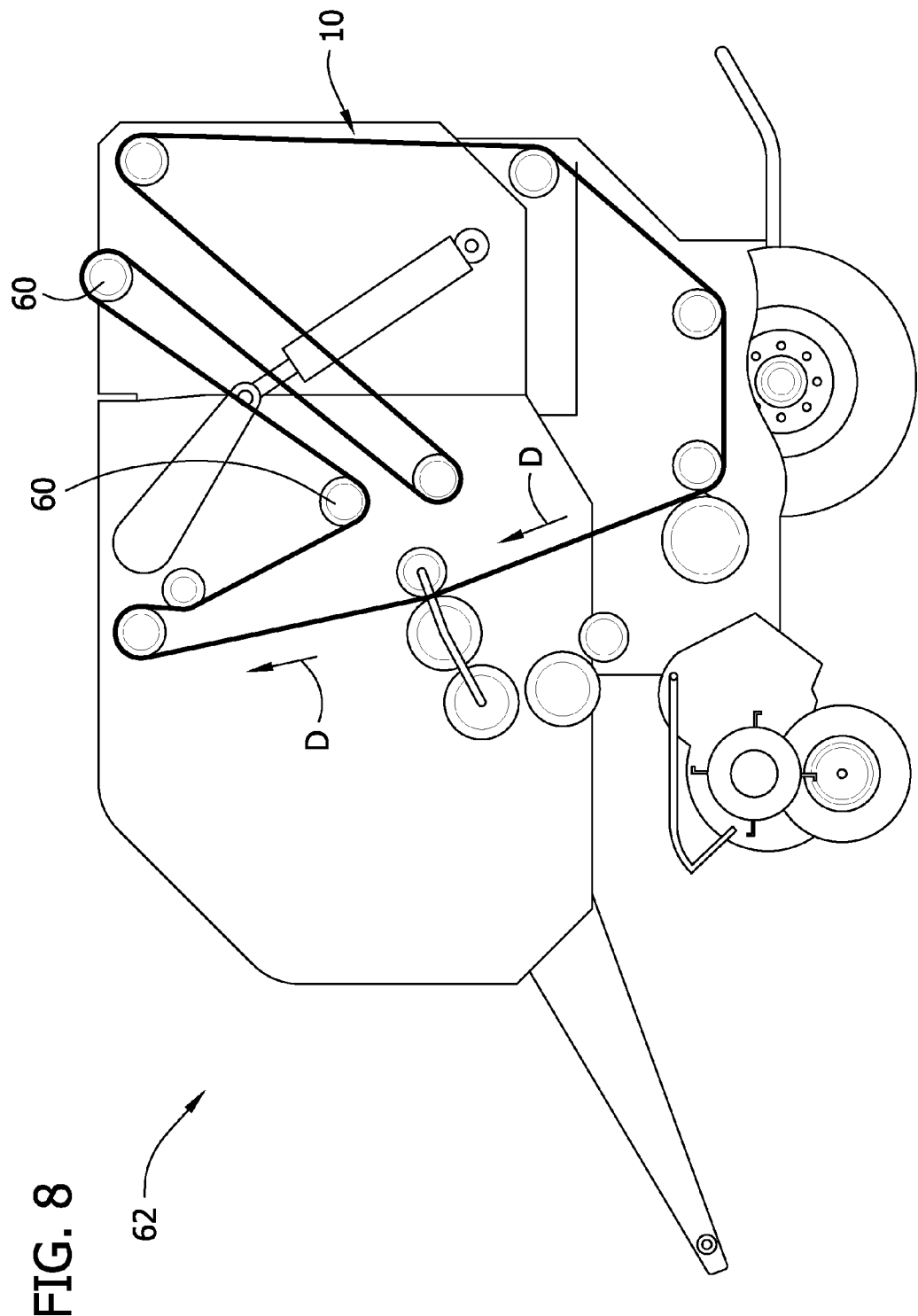
FIG. 8 is a schematic of an interior of a hay baler with the belt of FIG. 1 being received around rollers in the interior of the baler.

Referring to FIG. 8, in a preferred use a plurality of the baler belts 10 (e.g., eight) are wrapped around a series of rollers 60 within a hay baler, generally indicated at 62. The belts 10 are driven around the rollers 60 in a direction of travel, as indicated by arrows D (see also, FIGS. 5 and 6). As the hay baler 62 picks up hay, the belts 10 compress the hay into round bundles. The belts 10 are preferably mounted on the rollers 60 so that the outer ends 38a, 38b of the carcass cords 22a, 22b are protected by the opposing part of the respective laterally outermost turn 46a, 46b. In other words, each of the first ends 38a, 38b of the carcass cords 22a, 22b lead at least a part of the respective transition portion 50a, 50b of the respective laterally outermost turn 46a, 46b (see, FIGS. 5 and 6). That is, the first ends 38a, 38b will pass one of the rollers 60 before the entirety of the respective transition portion 50a, 50b passes the roller. In the illustrated embodiment, each of the first ends 38a, 38b of the carcass cords 22a, 22b lead the entire respective transition portion 50a, 50b of the respective laterally outermost turn 46a, 46b. In this way, it is less likely that debris, such as shards from broken bottles, will catch on the outer ends 38a, 38b of the carcass cords 22a, 22b and pull them out of the body 12 (i.e., fray), causing failure of the belt 10. Thus, the belt 10 has a preferred direction of travel as described. The belt 10 includes arrows 64 (broadly, indicia; FIG. 1) indicative of the preferred direction of travel of the belt 10, so that a person installing the belt and/or replacing the belt is cognizant of the preferred direction of travel.

Having described the invention in detail, it will be apparent that modifications and variations are possible without departing from the scope of the invention defined in the appended claims.

When introducing elements of the present invention or the preferred embodiments(s) thereof, the articles "a", "an", "the" and "said" are intended to mean that there are one or more of the elements. The terms "comprising", "including" and "having" are intended to be inclusive and mean that there may be additional elements other than the listed elements.

In view of the above, it will be seen that the several objects of the invention are achieved and other advantageous results attained.

As various changes could be made in the above constructions, products, and methods without departing from the scope of the invention, it is intended that all matter contained in the above description and shown in the accompanying drawings shall be interpreted as illustrative and not in a limiting sense.

What is claimed is:

1. A baler comprising
a series of rollers driven about generally parallel rotational axes,
an endless elastomeric belt received around the rollers so that the rollers drive the belt in a direction of travel, the elastomeric belt comprising
a carcass including
an elastomeric matrix having opposite edges defining a width of the matrix and
first and second cords embedded in the matrix, the first and second cords being wound generally along the direction of travel, each cord having a first end generally adjacent to a center of the width of the matrix and a second end generally adjacent to one of the edges of the matrix, each cord having a laterally outermost turn including the outer end, the laterally outermost turn of each cord extending parallel to the direction of the travel of the belt at a primary portion and extending at an angle with respect to the direction of travel at a transition portion, each of the first ends of the cords leading at least a part of the transition portion of the respective laterally outermost turn with respect to one of the rollers as the belt is driven on the rollers,
wherein the first cord is wound in a Z-direction along the length of the belt, wherein the first cord includes a Z-cord comprising at least two threads wound in the Z-direction relative to the first cord, and wherein the second cord is wound in an S-direction along the length of the belt, wherein the second cord includes an S-cord comprising at least two threads wound in the S-direction relative to the second cord.

2. A carcass for an endless elastomeric belt comprising
a body extending in an endless loop around the length of the belt, the body having a centerline and opposite longitudinal edges;
a first cord generally within the body, the first cord being wound in a Z-direction along the length of the belt and having an inner end generally adjacent to the centerline of the body and an outer end generally adjacent to one of the opposite longitudinal edges of the body, wherein the first cord includes a Z-cord comprising at least two threads wound in the Z-direction relative to the first cord,
a second cord generally within the body, the second cord being wound in an S-direction along the length of the belt and having an inner end generally adjacent to the centerline of the body and an outer end generally adjacent to one of the opposite longitudinal edges of the body remote from the outer end of the first cord, wherein the second cord includes an S-cord comprising at least two threads wound in the S-direction relative to the second cord.

3. A carcass as set forth in claim 2 wherein the first cord includes a laterally outermost turn containing the outer end and being located nearest said one longitudinal edge of the body, the outer end of the cord being located in a position which is not substantially laterally outward of other portions of the laterally outermost turn of the cord.

4. A carcass as set forth in claim 2 wherein the body comprises an elastomeric matrix and the first and second cords are embedded in the elastomeric matrix.

5. A carcass as set forth in claim 2 wherein the first and second cords are located generally on opposite sides of the centerline of the body.

6. A flexible endless belt having a length defining a direction of travel in use, the belt comprising:
a body extending in an endless loop around the length of the belt, the body having a centerline and opposite longitudinal edges; and
a carcass generally within the body, the carcass including
a first cord generally within the body, the first cord being wound in a Z-direction along the length of the belt and having an inner end generally adjacent to the centerline of the body and an outer end generally adjacent to one of the opposite longitudinal edges of the body, wherein the first cord includes a Z-cord comprising at least two threads wound in the Z-direction relative to the first cord, the first cord including a laterally outermost turn containing the outer end and being located nearest said one longitudinal edge of the body, the laterally outermost turn of the first cord including a first portion in which the cord extends substantially parallel to the centerline of the body and a second portion in which the cord extends at an angle with respect to the centerline, the outer end of the first cord being located in a position which is not substantially laterally outward of the first portion of the laterally outermost turn of the cord, and a second cord generally within the body, the second cord being wound in an S-direction along the length of the belt and having an inner end generally adjacent to the centerline of the body and an outer end generally adjacent to one of the opposite longitudinal edges of the body remote from the outer end of the first cord, wherein the second cord includes an S-cord comprising at least two threads wound in the S-direction relative to the second cord, the second cord including a laterally outermost turn containing the outer end and being located nearest said one of the opposite longitudinal edges of the body remote from the outer end of the first cord, the laterally outermost turn of the second cord including a first portion in which the cord extends substantially parallel to the centerline of the body and a second portion in which the cord extends at an angle with respect to the centerline, the outer end of the second cord being located in a position which is not substantially laterally outward of the first portion of the laterally outermost turn of the cord.

7. A flexible endless belt as set forth in claim 6 wherein the first cord and second cord are in side-by-side relationship within the body.

8. A flexible endless belt as set forth in claim 7 wherein the first cord lies on one side of the centerline of the body and the second cord lies on an opposite side of the centerline of the body.

9. A flexible endless belt as set forth in claim 6 wherein the first cord and second cord are wound around a common axis.

10. A flexible endless belt as set forth in claim 6 wherein the outer end of the first cord is substantially aligned with a longitudinally opposing part of the laterally outermost turn of the first cord, and wherein the outer end of the second cord is substantially aligned with a longitudinally opposing part of the laterally outermost turn of the second cord.

11. A flexible endless belt as set forth in claim 10 wherein the multiple turns of the first and second cords define a first section in which the cords extend substantially parallel to the centerline of the body and a second section in which the cords extend at an angle to the centerline.

12. A flexible endless belt as set forth in claim 11 wherein the outer ends of the first and second cords are located at one longitudinal end of the second section.

13. A flexible endless belt as set forth in claim 12 wherein the inner ends of the first and second cords are located at a longitudinal end of the second section that is opposite to the longitudinal end of the second section including the outer ends of the first and second cords.

14. A flexible endless belt as set forth in claim 13 wherein a lesser number of the turns of the first and second cords pass through the second section than the first section.

15. A flexible endless belt as set forth in claim 6 wherein the first portion comprises a continuous longitudinal portion of the cord, wherein the second portion comprises a different continuous longitudinal portion of the cord, the laterally outermost turn consisting of the first portion and the second portion.

\* \* \* \* \*